Dec. 22, 1925.  
W. R. FOX  
1,566,849  
COUPLING FOR FLEXIBLE SHAFTING  
Filed Feb. 24, 1921

Inventor:  
William R. Fox.

Patented Dec. 22, 1925.

1,566,849

UNITED STATES PATENT OFFICE.

WILLIAM R. FOX, OF JACKSON, MICHIGAN, ASSIGNOR TO FOX MACHINE COMPANY, OF JACKSON, MICHIGAN, A CORPORATION OF MICHIGAN.

COUPLING FOR FLEXIBLE SHAFTING.

Application filed February 24, 1921. Serial No. 447,514.

*To all whom it may concern:*

Be it known that I, WILLIAM R. Fox, a citizen of the United States, and resident of Jackson, Michigan, have invented certain new and useful Improvements in Couplings for Flexible Shafting, of which the following is a specification.

My invention concerns means for securing together the spindles or sections of a flexible shafting with the forks which form a part of the coupling between said shaft sections.

Figure 1:
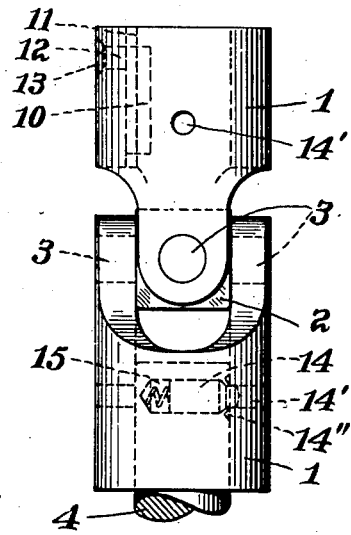
Fig. 1 is a side view of a shaft coupling.
Figure 2:
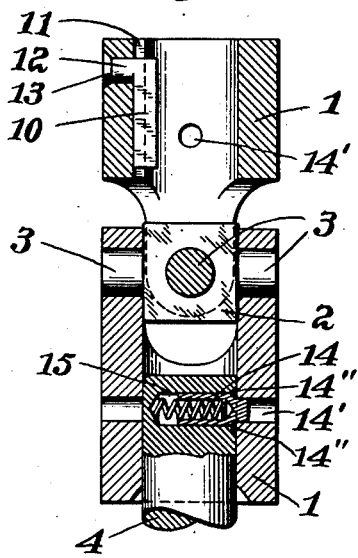
Fig. 2 is a sectional view.

The fork members are shown at 1. These are pivoted to a center block 2, for which purpose the arms of the fork are perforated and pins 3 of the center block fit in these openings.

One of the shaft sections is shown at 4.

In connecting the fork members with the shaft sections, it is customary to use a taper pin extending through the fork and spindle or shaft. This form of fastening is not reliable, because the pin is apt to loosen or to be sheared off. Further, in order to remove the joint, it is necessary first to take out the pin and this is difficult to do where the joints are located under the head of the drill press; also in replacements it is difficult to match a taper pin hole, more so because the forks are hardened and will not admit of any drilling or reaming after they are completed, this being necessary in case taper pins are used.

In my present construction I employ a key 10 seated in a key slot 11 within the base of the fork member, wherein it is held by its projection 12, riveted at 13. I do not wish to be restricted to this method of fastening the key as it may be secured to the spindle instead of the fork, the projections 12 being driven into a hole drilled in the spindle instead of in the fork. This will connect the spindle to the fork in a manner to make a durable and effective drive, the key presenting an extended wearing surface and a long body of metal to take the driving strains.

In order to retain the coupling and the spindle in proper relation against relative displacement axially of the parts, I provide a spring-pressed plunger 14 in a transverse opening 15 in the spindle or shaft, to engage the recess 14' in the fork member. The clutch is retained in the spindle by upsetting the metal around the opening by the indents at 14''.

It will be seen from above that because of the key and the keyway construction the parts will be connected to transmit power from one to the other by simply slipping them into connection and that because of the spring clutch construction including the plunger, the relative axial position of the coupling member and the spindle will be determined and they will be retained in position though readily detachable by the use of a suitable tool in the general form of a pair of pliers or any other suitable means can be used to depress the plunger sufficiently to allow separation of the parts without exerting extra pressure.

It will be understood that while I have shown the key at one coupling fork and the spring-pressed plunger connection at the other fork, both of these connections are used at each fork.

I claim:

A shaft coupling comprising an outer tubular member having a cylindrical recess in the wall thereof, the axis of which is perpendicular to the axis of the tubular member, and an inner cylindric spindle member to fit said tubular member having a cylindric recess extending transversely thereof, and part way therethrough and of larger diameter than the recess in the tubular member, a cylindric plunger in the recess of the spindle member having a reduced cylindric end to fit the recess in said tubular member, said reduced end of the plunger forming a shoulder, the wall of said recess in the inner cylindric member, having a stop to cooperate with said shoulder to limit the outward movement of the plunger, and a compression spring located between said plunger and the bottom of the recess in the cylindric spindle member.

In testimony whereof, I affix my signature.

WILLIAM R. FOX.